United States Patent
Wieczorek et al.

(10) Patent No.: US 8,884,239 B2
(45) Date of Patent: Nov. 11, 2014

(54) HIGH RESOLUTION MEDICAL IMAGING DETECTOR

(75) Inventors: Herfried Wieczorek, Aachen (DE); Andreas Goedicke, Aachen (DE); Thomas Frach, Aachen (DE)

(73) Assignee: Koninklijke Philips N.V., Eindhoven (NL)

( * ) Notice: Subject to any disclaimer, the term of this patent is extended or adjusted under 35 U.S.C. 154(b) by 1400 days.

(21) Appl. No.: 12/063,769

(22) PCT Filed: Jul. 27, 2006

(86) PCT No.: PCT/IB2006/052584
§ 371 (c)(1), (2), (4) Date: Feb. 14, 2008

(87) PCT Pub. No.: WO2007/023401
PCT Pub. Date: Mar. 1, 2007

(65) Prior Publication Data
US 2010/0176301 A1    Jul. 15, 2010

Related U.S. Application Data

(60) Provisional application No. 60/596,047, filed on Aug. 26, 2005.

(51) Int. Cl.
*G01T 1/164* (2006.01)

(52) U.S. Cl.
CPC .................................. *G01T 1/1642* (2013.01)
USPC ................................... 250/370.11

(58) Field of Classification Search
USPC ................................... 250/370.11
See application file for complete search history.

(56) References Cited

U.S. PATENT DOCUMENTS

| | | | |
|---|---|---|---|
| 3,978,337 A | | 8/1976 | Nickles et al. |
| 5,464,984 A | * | 11/1995 | Cox et al. .................. 250/370.11 |
| 6,114,703 A | * | 9/2000 | Levin et al. .................... 250/367 |
| 6,124,595 A | * | 9/2000 | Engdahl et al. ............... 250/366 |
| 6,462,341 B1 | | 10/2002 | Muehllehner |
| 7,138,632 B2 | * | 11/2006 | Yamada et al. ............... 250/367 |
| 7,626,389 B2 | * | 12/2009 | Fiedler et al. ................. 324/309 |
| 7,723,694 B2 | * | 5/2010 | Frach et al. .............. 250/370.11 |
| 2004/0007670 A1 | * | 1/2004 | Bryman ........................ 250/366 |
| 2008/0317200 A1 | * | 12/2008 | Lecomte et al. ................. 378/19 |

FOREIGN PATENT DOCUMENTS

| | | | |
|---|---|---|---|
| WO | 9637791 A1 | | 11/1996 |
| WO | 02079802 A2 | | 10/2002 |
| WO | 2004111681 A1 | | 12/2004 |
| WO | 2005048319 A2 | | 5/2005 |
| WO | WO 2005062073 A1 | * | 7/2005 |

OTHER PUBLICATIONS

Moehrs, S., et al.; A Small-Animal PET Design Using SiPMs and Anger Logic with Intrinsic DOI; 2004; IEEE Trans. on Nuclear Science Symposium; vol. 6; pp. 3475-3479.

* cited by examiner

*Primary Examiner* — David Porta
*Assistant Examiner* — Shun Lee

(57) ABSTRACT

A detector arrangement providing imaging information at the edge of the scintillator is provided. The detector arrangement provides complete information and improved spatial resolution. SiPMs can be used in place of PMTs in order to provide the geometrical coverage of the scintillator and improved spatial resolution. With such detector arrangements, the spatial resolution can be under 2 mm. Furthermore, the overall thickness of the detector can be substantially reduced and depth of interaction resolution is also improved.

22 Claims, 4 Drawing Sheets

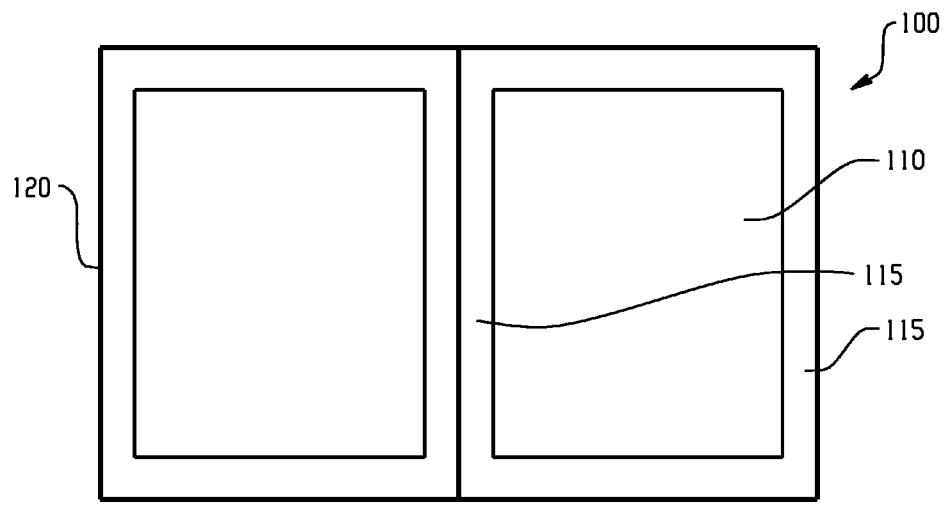
Fig. 5
PRIOR ART
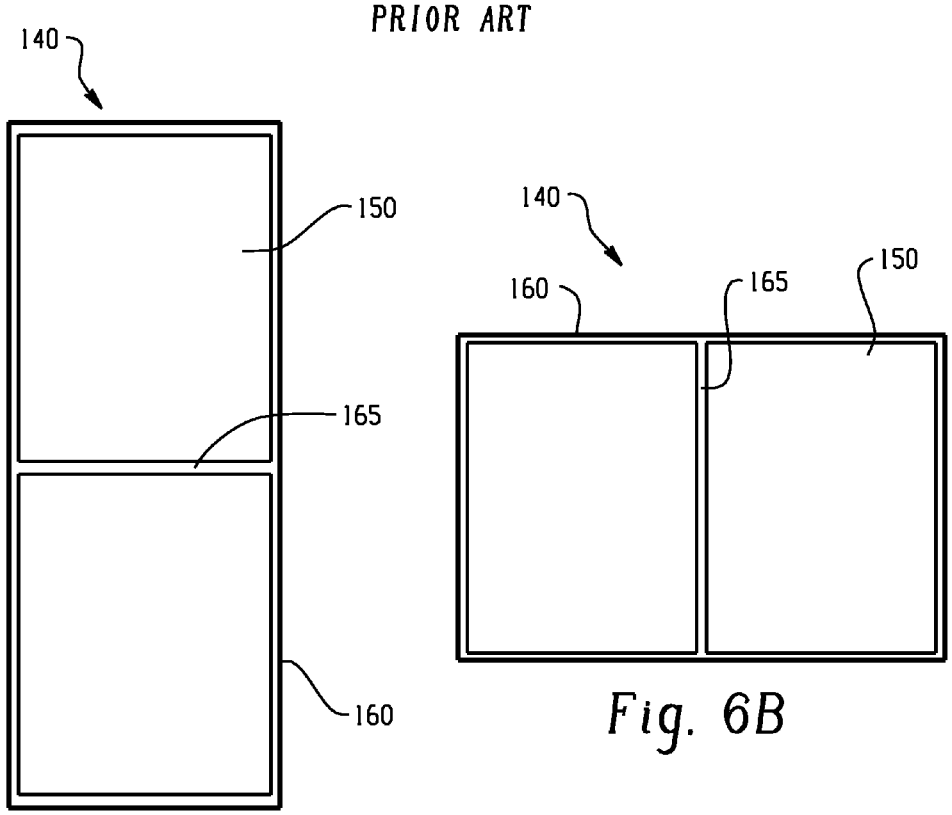
Fig. 6A
Fig. 6B

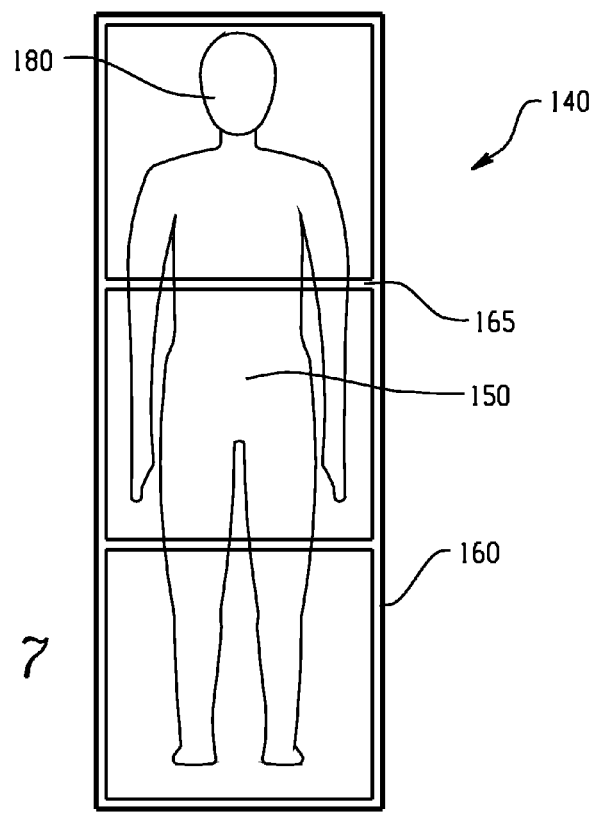
Fig. 7
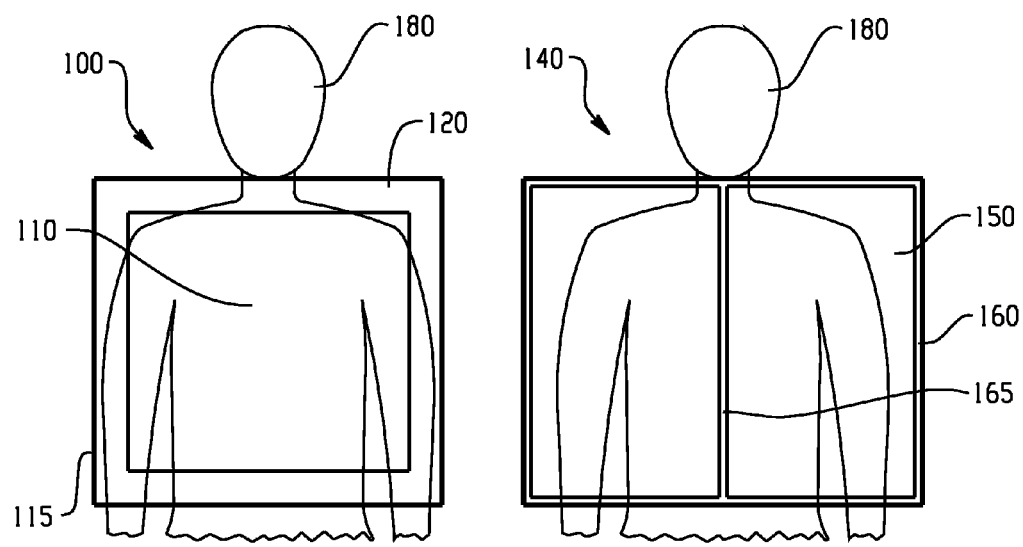
Fig. 8A
PRIOR ART
Fig. 8B

HIGH RESOLUTION MEDICAL IMAGING DETECTOR

CROSS REFERENCE TO RELATED APPLICATIONS

This application claims the benefit of U.S. provisional application Ser. No. 60/596,047 filed Aug. 26, 2005, which is incorporated herein by reference.

The present invention relates to detectors for medical imaging equipment, such as single photon emission computer tomography (SPECT) or Positron Emission Tomography (PET). A typical SPECT detector arrangement is shown in FIG. 1. Photons P, such as gamma photons in the case of SPECT, enter the detector and strike a scintillator crystal X. Typically, the scintillator crystal X is a solid block of sodium iodide. When a gamma ray strikes the crystal X, it becomes a brilliant flash of light, which finds its way into a photo multiplier tube PMT. The photo multiplier tube PMT converts the flash of light into electrons, which are subsequently processed to produce an image by the imaging system electronics. A collimator C can be used to limit the photons entering the detector to those coming at a specific orientation, while the light guide LG is used to spread the light emitted after absorption of a single gamma photon.

As medical imaging equipment continues to become more important for improved medical diagnosis and medical treatments, there is a need to provide improved medical imaging quality. Standard SPECT systems use Anger cameras, consisting of NaI crystal X and a square or hexagonal array of photo multiplier tubes PMT. An Anger camera has an active area of roughly 40×50 $cm^2$. The scintillator plates are generally larger than the active area of the Anger camera. The intrinsic spatial resolution of an Anger camera is determined by Anger logic, a weighting algorithm that determines the point of interaction for a single gamma quantum as a function of the signal measured in some neighboring photo multiplier tubes PMT.

There are two problems in current Anger cameras. First, since the active area of the camera is smaller than the crystal plate X and the photo multiplier tube array PMT, two Anger cameras cannot be positioned close to one another. Such an arrangement is used in, for example, a fixed 90 degree Cardiac SPECT system. This difference in size is caused by "missing" data at the detector edges. The data is "missing" partly due to reflection at the crystal edge and partly due to the fact that there are no photo multiplier tubes PMT at and beyond the crystal edge so that the averaging procedure of Anger logic is not possible. Second, the intrinsic spatial resolution is typically around 3-4 mm due to the uncertainty in the determination of the point where the gamma quantum was absorbed. The exact spatial resolution of the Anger camera depends on the size of the photo multiplier tubes PMT used. Typical photo multiplier tubes PMT have a diameter between 38 and 76 mm.

As such, it is desirable to provide a medical imaging detector that solves one or more of these problems.

The present invention is directed to an improved detector arrangement. A detector arrangement providing imaging information at the edge of the scintillator is provided. The detector arrangement provides complete information and improved spatial resolution.

In some embodiments, SiPMs are used to provide the geometrical coverage of the scintillator and improved spatial resolution. With such detector arrangements, the spatial resolution can be under 2 mm.

In some embodiments, layers of SiPMs are placed on a front plane, and a back plane to increase the amount of information obtained from the scintillator. Some embodiments include a layer of SiPMs on the sides of the scintillator. Multiple layers of SiPMs improve the depth of interaction resolution of the detector.

In some embodiments, the overall thickness of the detector can be substantially reduced. Some embodiments have a combined thickness of the scintillator, any light guides included, and any layers of SiPMs that is less than 20 mm. Such embodiments make the detector much more sleek and lightweight.

In the accompanying drawings, which are incorporated in and constitute a part of this specification, embodiments of the invention are illustrated, which, together with a general description of the invention given above, and the detailed description given below serve to illustrate the principles of this invention. One skilled in the art should realize that these illustrative embodiments are not meant to limit the invention, but merely provide examples incorporating the principles of the invention.

FIG. 5 illustrates a prior art detector arrangement with substantial non-imaged areas.

FIGS. 6A and 6B illustrate a detector arrangement that provides negligible non-imaged areas.

FIG. 7 illustrates the detector arrangement shown in FIG. 6A, as applied to a whole-body scan.

FIG. 8A is a prior art detector arrangement shown in application to a patient.

FIG. 8B is the detector arrangement shown in FIG. 6B as applied to a patient.

The medical imaging detector disclosed herein provides an improved spatial resolution and thereby provides improved image quality. The detector provides for a more compact arrangement thereby making efficient use of space. In some embodiments, small avalanche photodiode cells operated in limited Geiger mode, such as silicon photomultipliers (SiPMs) are used in place of the photo multiplier tubes. The use of SiPMs allows for improved spatial resolution and creates a more compact detector arrangement, as discussed further herein below.

Figure 2:
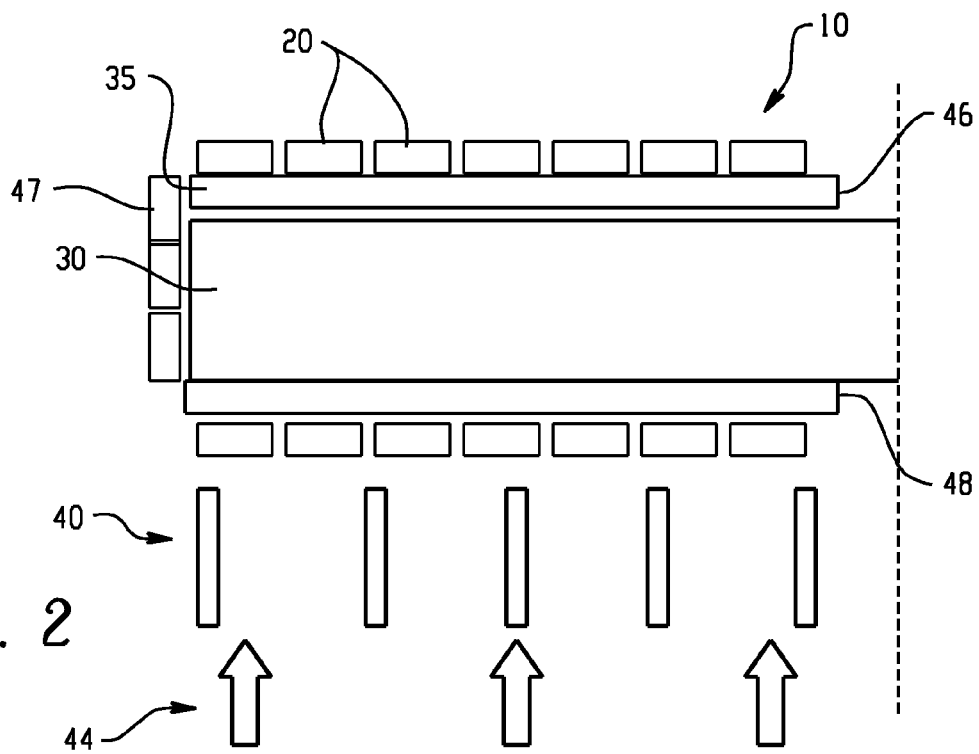
FIG. 2 shows an illustrative example of an embodiment of the detector arrangement of the present invention.

FIG. 2 shows an illustrative embodiment of the present invention. The detector 10 includes an array of SiPMs 20 and a scintillator 30. In some embodiments, the detector may also include one or more light guides 35 and/or a collimator 40. Gamma rays 44 enter the detector 10 through the collimator 40 and strike the scintillator crystal 30. As with the prior art scintillator crystals, when a gamma ray strikes the scintillator, a burst of light is generated. The light is then detected by the SiPMs, which produce electrical signals that are produced into an image.

The scintillator crystal 30 can be sodium iodide or any other scintillating material, such as, for example, cesium iodide, lanthanum bromide, lanthanum chloride, lutetium oxyorthosilicate, lutetium yttrium orthosilicate, lutetium pyrosilicate, bismuth germinate, gadolinium orthosilicate, lutetium gadolinium orthosilicate, or other suitable material. This invention should not be restricted in any way with regard to the scintillator, as any scintillator with sufficient light amplitude will suffice.

Figure 1:
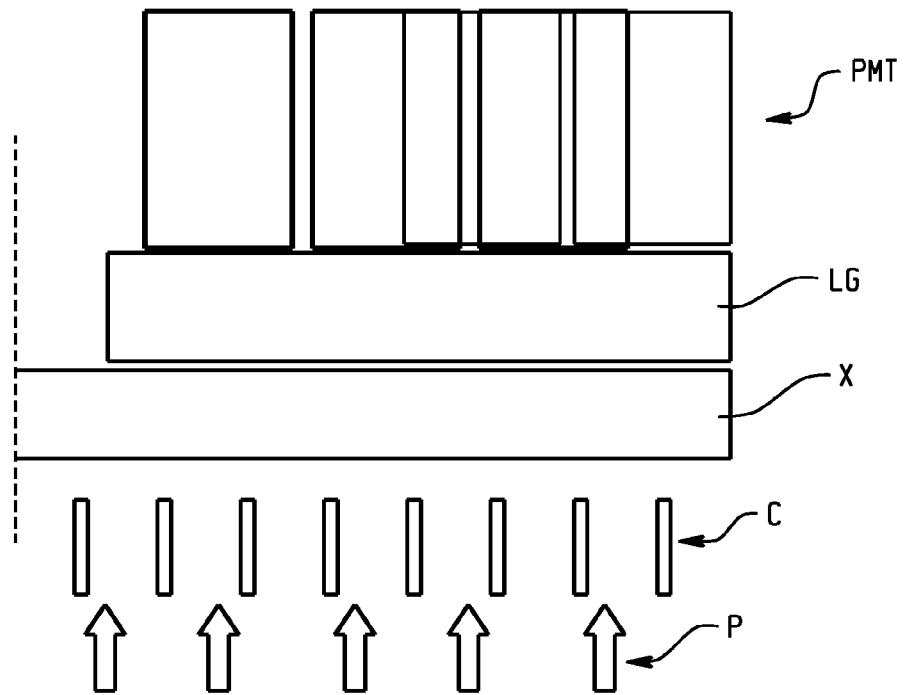
FIG. 1 illustrates a prior art detector arrangement.

The SiPMs 20 are positioned on the front plane 46 of the crystal 30. In some embodiments, SiPMs 20 are also positioned on either the sides 47 of the crystal 30, the back plane 48 of the crystal 30, or both. The relative small nature of the SiPMs remove the missing data caused by the gaps in the PMT arrangement near the crystal edge. Additional data may be obtained when SiPM detectors are connected to the sides 47 and/or back plane 48 of the crystal 30, since Anger logic can then be applied to even the outer most SiPMs 20. Since the SiPMs are only approximately 0.5 mm thick, the addition of SiPMs on the sides 47 and/or back plane 48 do not substantially alter the overall size of the detector arrangement, which is substantially smaller than the conventional PMT arrangement shown in FIG. 1. A conventional detector arrangement is approximately 275 mm thick: approximately 250 mm for the photo multiplier tube PMT array, approximately 16 mm for the light guide LG, and approximately 10 mm for the scintillator plate X. In comparison, the embodiment shown in FIG. 2 is approximately 16 mm thick: approximately 1 mm for two layers of SiPMs 20, approximately 5 mm for two layers of light guides 35, and approximately 10 mm for the scintillator plate 30. Obviously, the overall thickness of the conventional detector arrangement and the detector arrangement shown in FIG. 2 can be modified depending on the type of scintillator used, the desired thickness of the light guides, the number of layers used for the light guides and SiPMs, and the type of SiPM, or other avalanche diode, used. However, the relative size reduction achieved by the present invention remains substantial. By reducing the overall thickness of the detector arrangement by a factor of 20 to 30, the overall size and weight that an imaging system gantry must support is substantially reduced.

Figure 3:
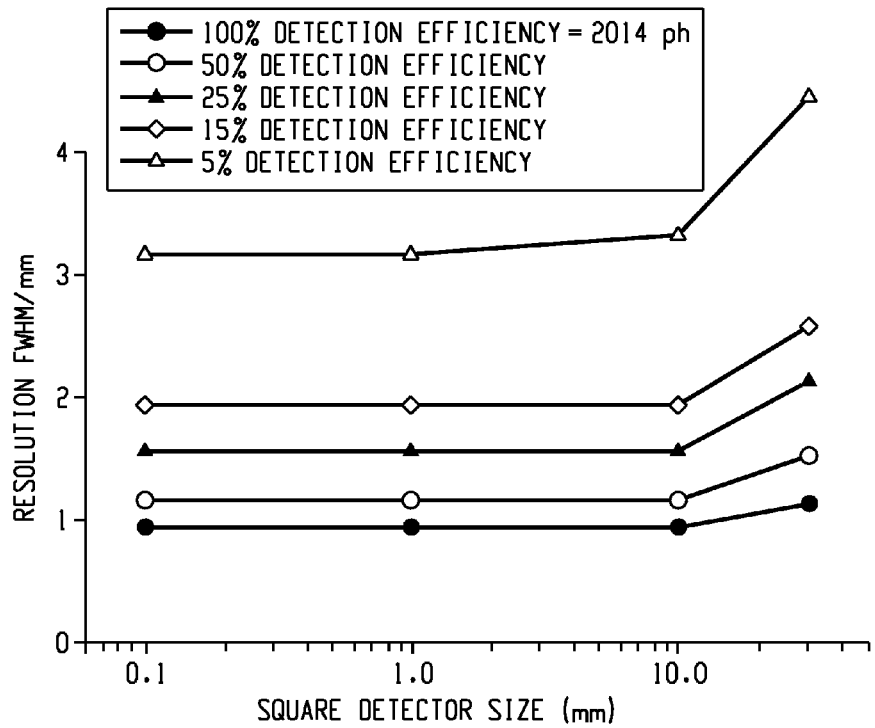
FIG. 3 is a graphical illustration of detector size versus spatial resolution.

As shown in FIG. 3, the size and the detection efficiency of the SiPMs 20 determine the spatial resolution of the detector. As shown in the results of the Monte Carlo simulation in FIG. 3, the spatial resolution of a detector with 25 percent detector efficiency and SiPMs 10 mm or under is approximately 1.5 mm. The simulation shows that SiPMs of 10 mm or under generally have the same spatial resolution, while SiPMs larger than 10 mm have lower resolution (higher numerical values). The spatial resolution of the detector may also increase to 1 mm or less if a higher detection efficiency is achieved.

Figure 4:
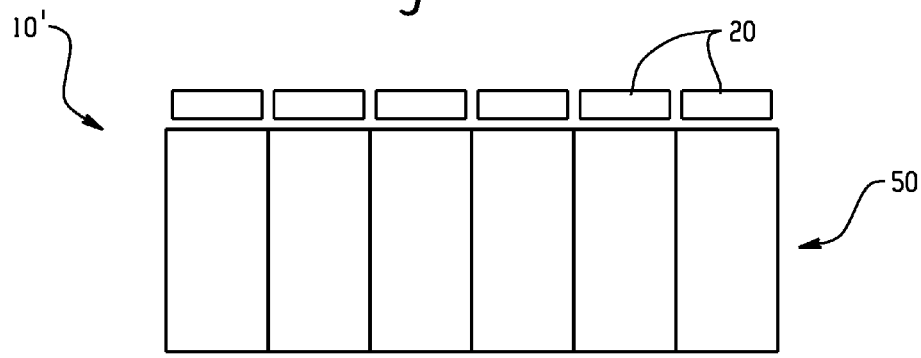
FIG. 4 shows an alternative embodiment of the detector arrangement of the present invention.
Figure 4:
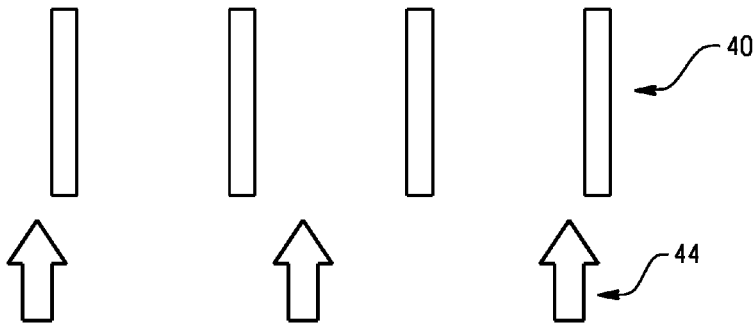

FIG. 4 illustrates another embodiment 10' of the present invention. Generally the components of the detector arrangement are the same as shown in FIG. 2, however, the scintillator plate 30 is replaced with scintillator pixels 50. The scintillator pixels 50 are directly coupled to the SiPMs 20 in a one-to-one correspondence. In such embodiments, light guides are not generally required.

The detector arrangement 10 described herein further provides a depth-of-interaction (DOI) measurement, which is enabled by the better sampling available due to the relatively small pixels. The enhanced DOI measurement is especially valuable for providing better spatial resolution under oblique incidence. The use of a layer of SiPMs 20 on the back plane 48 of the crystal 30 provides even further DOI information.

FIGS. 6A and 6B illustrate one implementation of the detector arrangement described herein. FIG. 5 illustrates a prior art version of a detector 100. The arrangement of the prior art detector 100 creates a detector area 110 that is less than the camera area 115. Consequently, when two cameras are placed side-by-side, as shown in FIG. 5, there are areas that are non-imaged 120, including a non-imaged area between the two detector areas 110. In comparison, when two cameras employing the detector arrangement 140 described in this application are tiled, congruent, placed side-by-side, as shown in FIG. 6B, or top-to-bottom, as shown in FIG. 6A, a complete image area is created. This is because the detector area 150 is equal to, or nearly equal to, the camera area 160. This leaves non-imaged areas 165 that are negligible.

As shown in FIGS. 7 and 8B, larger complete imaging areas can be important when viewing larger patients or larger portions of patients, such as full body scans. The more complete imaging area allows for simultaneous imaging of a larger imaged area, thereby increasing overall scan time. For example, in comparing the prior art detector arrangement 100 shown in FIG. 8A with the embodiment of the new detector arrangement 140 shown in FIG. 8B, it shown how placement of multiple cameras employing the new detector arrangement 140 provides more complete imaging of the imaged area. In the prior art, shown in FIG. 8A, portions of the patient 180 lie outside the detector area 110, thus producing an incomplete image. If two cameras were placed sided-by-side to cover the entire width of the patient 180, the unused edge portions of the camera would produce substantial non-imaged areas 120 in the middle of the image of the patient 180. In comparison, two cameras with detector arrangements 140 shown in FIG. 8B have a detector areas 150 that are substantially equal to the camera area 160. The non-imaged areas 165 produced by detector arrangements 140 are negligible, thereby allowing simultaneous imaging of large areas. FIG. 7 illustrates how this is applicable to a whole-body planar scan using three cameras.

The invention has been described with reference to one or more preferred embodiments. Clearly, modifications and alterations will occur to other upon a reading and understanding of this specification. It is intended to include all such modifications, combinations, and alterations insofar as they come within the scope of the appended claims or equivalents thereof.

The invention claimed is:

1. A detector for a medical imaging system comprising:
a scintillator which receives photons emitted from an imaging source;
a front layer of SiPMs adjacent to a front plane of the scintillator, the front layer of SiPMs detects scintillations in the scintillator, said front layer of SiPMs covering a full surface of the front plane, such that imaging data is obtained from the edges of the scintillator;
a back layer of SiPMs adjacent to a back plane of the scintillator through which the photons from the imaging source are received, the back layer of SiPMs detects scintillations in the scintillator; and
a light guide located between and optically coupling each layer of SiPMs and the scintillator.

2. The detector of claim 1 further comprising a layer of SiPMs attached to one or more sides of the scintillator.

3. The detector of claim 1, wherein the scintillator is selected from the group consisting of sodium iodide, cesium iodide, lanthanum bromide, lanthanum chloride, lutetium oxyorthosilicate, lutetium yttrium orthosilicate, lutetium pyrosilicate, bismuth germinate, gadolinium orthosilicate, and lutetium gadolinium orthosilicate.

4. The detector of claim 1, wherein the intrinsic spatial resolution of the detector is under 2 mm.

5. The detector of claim 1, wherein the overall thickness of the scintillator, the light guides, and the SiPM layers is less then 20 mm.

6. A medical imaging system including at least two detectors, each detector comprising:
a scintillating material which receives photons emitted from an imaging source;

a first layer of SiPMs optically coupled to a front plane of the scintillating material;
a second layer of SiPMs optically coupled to a back plane of the scintillating material; and
a third layer of SiPMs optically coupled to one or more sides of the scintillating material.

7. The medical imaging system of claim 6, wherein the detector further comprising a first light guide located between the first layer of SiPMs and the scintillating material to optically couple the first layer of SiPMs to the scintillating material and a second light guide located between the second layer of SiPMs and the scintillating material to optically couple the second layer of SiPMs to the scintillating material.

8. The medical imaging system of claim 7, wherein the combined thickness of the light guides, the first and second SiPM layers, and the scintillating material is less than 20 mm.

9. The medical imaging system of claim 6, wherein the scintillating material is selected from the group consisting of sodium iodide, cesium iodide, lanthanum bromide, lanthanum chloride, lutetium oxyorthosilicate, lutetium yttrium orthosilicate, lutetium pyrosilicate, bismuth germinate, gadolinium orthosilicate, and lutetium gadolinium orthosilicate.

10. The medical imaging system of claim 6, wherein the intrinsic spatial resolution of the detector is under 2 mm.

11. The medical imaging system of claim 6, wherein the scintillating material of each detector is pixelated.

12. The medical imaging system of claim 6, wherein the first, second, and third layers of SiPMs in each detector provide a depth-of-interaction measurement.

13. A medical imaging system comprising:
(a) an imaging area in which an object containing a radionuclide is positioned, the radionuclide causing photons to be emitted from the object;
(b) one or more detectors which detects the photons emitted from the object, each detector comprising:
(i) a scintillating material which receives the photons emitted from the object;
(ii) a first layer of SiPMs optically coupled to a front plane of the scintillating material;
(ii) a second layer of SiPMs optically coupled to a back plane of the scintillating material; and
(iii) a third layer of SiPMs optically coupled to one or more sides of the scintillating material, the first, second, and third layers of SiPMs generating image data for a reconstruction processor to reconstruct into an image.

14. The medical imaging system of claim 13, wherein the intrinsic spatial resolution of the detectors is under 2 mm.

15. The medical imaging system of claim 13, wherein the combined thickness of the first and second SiPM layers and scintillating material is less than 30 mm.

16. The medical imaging system of claim 13, wherein the scintillating material is selected from the group consisting of sodium iodide, cesium iodide, lanthanum bromide, lanthanum chloride, lutetium oxyorthosilicate, lutetium yttrium orthosilicate, lutetium pyrosilicate, bismuth germinate, gadolinium orthosilicate, and lutetium gadolinium orthosilicate.

17. A medical imaging apparatus comprising two or more cameras, each camera including a detector area of SiPMs and a camera area, wherein when said two or more cameras are positioned proximate one another, the sum of the camera detector areas is substantially equal to the sum of the camera areas.

18. The medical imaging apparatus of claim 17, wherein the two cameras are positioned side by side to define a substantially continuous detector area substantially equal to the sum of the camera areas.

19. The medical imaging apparatus of claim 17, wherein each of the cameras includes:
a scintillator layer defining the detector area;
a front light guide layer optically coupled to a front face of the scintillator layer;
a second light guide layer optically coupled to a rear face of the scintillator layer;
a first layer of the SiPMs optically coupled to the first light guide layer and extending to edges of the scintillator layer;
a second layer of the SiPMs optically coupled to the second light guide layer and extending to edges of the scintillator layer.

20. The medical imaging apparatus of claim 19, wherein the first and second layers of SiPMs provide a depth-of-interaction measurement.

21. A detector for a medical imaging system comprising:
a scintillator which receives photons emitted from an emission radiation imaging source;
a first light guide coupled to a front plane of the scintillator;
a first layer of SiPMs coupled to the first light guide to detect scintillations in the scintillator, said layer of SiPMs covering a full surface of the front plane, thereby enabling imaging data to be obtained from the edges of the scintillator;
a second light guide coupled to a back plane of the scintillator through which the photons from the emission radiation imaging source is received;
a second layer of SiPMs coupled to the second light guide to detect scintillations in the scintillator;
at least a third layer of SiPMs coupled to at least one of the side planes of the scintillator to detect the scintillations in the scintillator; and
wherein the first, second, and third layers of SiPMs detect the same scintillations and provide depth-of-interaction measurements.

22. A medical imaging apparatus, comprising:
two or more cameras positioned proximate one another, each camera having a camera area, each camera including the detector according to claim 21, each detector having a detector area, a sum of the detector areas being substantially equal to a sum of the camera areas to allow simultaneous imaging of areas larger than a camera area.

* * * * *